(12) United States Patent
Hull et al.

(10) Patent No.: US 12,487,248 B2
(45) Date of Patent: Dec. 2, 2025

(54) MEMS ACCELEROMETER SYSTEMS

(71) Applicant: Simmonds Precision Products, Inc., Vergennes, VT (US)

(72) Inventors: Richard A. Hull, Kissimmee, FL (US); Vasileios Tsachouridis, Cork City (IE)

(73) Assignee: Simmonds Precision Products, Inc., Vergennes, VT (US)

( * ) Notice: Subject to any disclaimer, the term of this patent is extended or adjusted under 35 U.S.C. 154(b) by 575 days.

(21) Appl. No.: 17/947,002

(22) Filed: Sep. 16, 2022

(65) Prior Publication Data

US 2024/0094238 A1  Mar. 21, 2024

(51) Int. Cl.
*G01P 15/125* (2006.01)
*G01D 1/16* (2006.01)
(Continued)

(52) U.S. Cl.
CPC ........ *G01P 15/125* (2013.01); *G01P 15/0802* (2013.01); *G01P 15/13* (2013.01);
(Continued)

(58) Field of Classification Search
CPC .... G01P 15/125; G01P 15/0802; G01P 15/13; G01P 15/131; G01P 2015/0814; G01D 1/16; G06N 7/00
See application file for complete search history.

(56) References Cited

U.S. PATENT DOCUMENTS

| | | | |
|---|---|---|---|
| 7,386,396 B2 | 6/2008 | Johnson | |
| 8,086,328 B2 | 12/2011 | Rojo | |
| 2014/0230520 A1* | 8/2014 | Bulatowicz | G06F 17/10 |
| | | | 702/96 |

FOREIGN PATENT DOCUMENTS

| | | |
|---|---|---|
| CN | 110879618 A | 3/2020 |
| CN | 111443738 A | 7/2020 |
| (Continued) | | |

OTHER PUBLICATIONS

Adaptive Control for Z-Axis Gyroscopes, Proceedings of the American Control Conference, Sungsu Park and Roberto Horowitz, Jun. 25-27, 2001.
(Continued)

*Primary Examiner* — Stephen D Meier
*Assistant Examiner* — Leo T Hinze
(74) *Attorney, Agent, or Firm* — Kinney & Lange, P.A.

(57) ABSTRACT

A MEMS accelerometer system can include a proof mass device having a proof mass configured to move from an initial position in response to an input acceleration, a transducer operatively connected to the proof mass device to output a transducer signal correlating to a movement and/or position of the proof mass, a driver operatively connected to the proof mass device and configured to drive the proof mass, and a controller operatively connected to the driver to control the driver. The controller is operatively connected to the transducer to receive the transducer signal and output a drive signal to the driver to drive the proof mass toward an initial position. The system can include an observer module operatively connected to the controller to receive the drive signal. The observer module can be operatively connected to the transducer to receive the transducer signal. The observer module can be configured to deterministically estimate the input acceleration based on the transducer signal and the drive signal based on a deterministic model. The observer module can be configured to output an estimated input acceleration signal.

10 Claims, 8 Drawing Sheets

(51) Int. Cl.
    *G01P 15/08*    (2006.01)
    *G01P 15/13*    (2006.01)
    *G06N 7/00*     (2023.01)
(52) U.S. Cl.
    CPC .............. *G01P 15/131* (2013.01); *G01D 1/16* (2013.01); *G06N 7/00* (2013.01)

(56)            References Cited

FOREIGN PATENT DOCUMENTS

| CN | 109541945 B | 11/2021 |
| EP | 2717060 A1  | 4/2014  |
| EP | 2770331 A1  | 8/2014  |
| EP | 3226006 A1  | 10/2017 |
| EP | 3521834 A1  | 8/2019  |

OTHER PUBLICATIONS

Adaptive Controls of MEMS Devices, Proceedings of the IASTED International Conference Intelligent Systems and Control, Afshin Izadian, Lawrence Hornak and Parviz Famouri, Aug. 14-16, 2006.
Extended European Search Report dated Jan. 19, 2024, received for European Application No. 23197784.4.

\* cited by examiner

MEMS ACCELEROMETER SYSTEMS

FIELD

This disclosure relates to MEMS accelerometer systems.

BACKGROUND

In traditional MEMS accelerometers, external applied specific acceleration (hereafter called the input acceleration) displaces a proof-mass and varies the distance of the formed capacitor plates, and, hence the overall capacitance. The above capacitance variation is transduced to an electrical voltage by a displacement transducer (e.g., a pick-off transducer) which can then be used by a control system in order to excite a drive force transducer to apply an appropriate electrical force (and acceleration) to balance the proof-mass into a desired zero position. The purpose of the accelerometer device is to sense the input acceleration and output an accurate estimate of the input acceleration which may either be used by another system, recorded, transmitted or displayed as required.

The input acceleration signal that is to be sensed can be estimated from the controller's output when the system rests in steady state. This is standard historical approach used in MEMS accelerometers to estimate the specific acceleration acting on the device. The controller is designed to operate on the displacement of the proof-mass (a mass-spring damper system), as sensed by the pick-off transducer, and generate a drive command signal to the force amplifier that will restore and maintain the proof-mass at it's centered (zero displacement) location. When the Proof-Mass is stabilized in the zero steady state position, the acceleration acting on the Proof-Mass due to the force amplifier exactly balances the specific acceleration acting on the system and is therefore a good estimate of the input acceleration. However, when the proof-mass is not stabilized in the zero steady state position, the controller's output is not a good estimate of the input acceleration, and an error in the estimate of the acceleration is created, for example.

Further, in cases/applications where significant temperature variations are developed the MEMS formed capacitor plates material can deform, and, hence the overall capacitance changes resulting in an additional temperature attributed bias error in the estimated acceleration.

Conventional MEMS methods and systems are agnostic to such temperature effects and incapable of resolving temperature related bias acceleration estimation errors.

Such conventional methods and systems have generally been considered satisfactory for their intended purpose. However, there is still a need in the art for improved MEMS accelerometer systems. The present disclosure provides a solution for this need.

SUMMARY

A MEMS accelerometer system can include a proof mass device having a proof mass configured to move from an initial position in response to an input acceleration, a transducer operatively connected to the proof mass device to output a transducer signal correlating to a movement and/or position of the proof mass, a driver operatively connected to the proof mass device and configured to drive the proof mass, and a controller operatively connected to the driver to control the driver. The controller is operatively connected to the transducer to receive the transducer signal and output a drive signal to the driver to drive the proof mass toward an initial position. The system can include an observer module operatively connected to the controller to receive the drive signal. The observer module can be operatively connected to the transducer to receive the transducer signal. The observer module can be configured to deterministically estimate the input acceleration based on the transducer signal and the drive signal based on a deterministic model. The observer module can be configured to output an estimated input acceleration signal to be used by any other device as required.

The observer module may not be connected to the input of the controller such that the estimated input acceleration signal is not used to control the driver or the position of the proof mass. The observer module can be configured to receive a temperature signal from a temperature sensor. In certain embodiments, the observer module can be configured to estimate the input acceleration further based on the temperature reading.

The observer module can include a displacement calculator module, a drive acceleration calculator module, and an observer dynamics module. The displacement calculator module can be configured to receive the transducer signal and the temperature signal, and to output a calculated displacement signal. The drive acceleration calculator module can be configured to receive the driver signal, the temperature signal, the calculated displacement signal, and a reference signal, and to output a calculated restorative acceleration signal that estimates the restorative acceleration required to drive the proof mass to the initial position.

The observer dynamics module can be operatively connected to the drive acceleration calculator module and the displacement calculator module. The observer dynamics module can be configured to calculate the estimated input acceleration based on the calculated restorative acceleration signal and calculated displacement signal.

The observer module can include a low pass filter operatively connected to the observer dynamics module to receive the estimated input acceleration signal to filter noise from the estimated input acceleration signal and to output a filtered estimated input acceleration signal. The observer module can be configured to generate an estimate of the proof-mass displacement $\hat{x}_{1_t}$, the proof-mass speed $\hat{x}_{2_t}$ and the input acceleration $\hat{a}_{in_t}$ in accordance with the below relationships:

$$\begin{bmatrix} \dot{\hat{x}}_{1_t} \\ \dot{\hat{x}}_{2_t} \\ \dot{\hat{x}}_{3_t} \end{bmatrix} = \begin{bmatrix} -K_1 & a_{12} & 0 \\ a_{21}-K_2 & a_{22}+L & L \\ -a_{21} & -a_{22}-L & -L \end{bmatrix} \begin{bmatrix} \hat{x}_{1_t} \\ \hat{x}_{2_t} \\ \hat{x}_{3_t} \end{bmatrix} + \begin{bmatrix} 0 & K_1 \\ 1 & K_2 \\ -1 & 0 \end{bmatrix} \begin{bmatrix} a_{d_{cal_t}} \\ x_{1_{cal_t}} \end{bmatrix}$$

$$\hat{a}_{in_t} = -L\hat{x}_{2_t} - L\hat{x}_{3_t}$$

wherein t denotes time, and $K_1$, $K_2$ and L are observer gains, $\hat{x}_{3_t}$ is an artificial observer state, and wherein $a_{12}$, $a_{21}$, $a_{22}$ are constant parameters in a proof-mass second order linear dynamical model from the total applied acceleration to proof-mass displacement as shown in the relationship below:

$$\begin{bmatrix} \dot{x}_{1_t} \\ \dot{x}_{2_t} \end{bmatrix} = \begin{bmatrix} 0 & a_{12} \\ a_{21} & a_{22} \end{bmatrix} \begin{bmatrix} x_{1_t} \\ x_{2_t} \end{bmatrix} + \begin{bmatrix} 0 \\ 1 \end{bmatrix} a_{d_t} - \begin{bmatrix} 0 \\ 1 \end{bmatrix} a_{in_t} + \begin{bmatrix} 0 \\ 1 \end{bmatrix} w_x.$$

$$y = x_{1_t} + w_y$$

wherein $w_x$ and $w_y$ denote unknown in general disturbances and/or uncertainties (e.g. measurement noise).

In certain embodiments, the system can include a device or system operatively connected to the low pass filter to receive the filtered input acceleration signal and either use, record, transmit or display the data as required. Any suitable module or other component disclosed herein, e.g., as described above, can be embodied as and/or include any suitable computational hardware and/or software.

In accordance with at least one aspect of this disclosure, an avionics system can include a MEMS accelerometer system. The MEMS accelerometer system can be any suitable accelerometer system disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
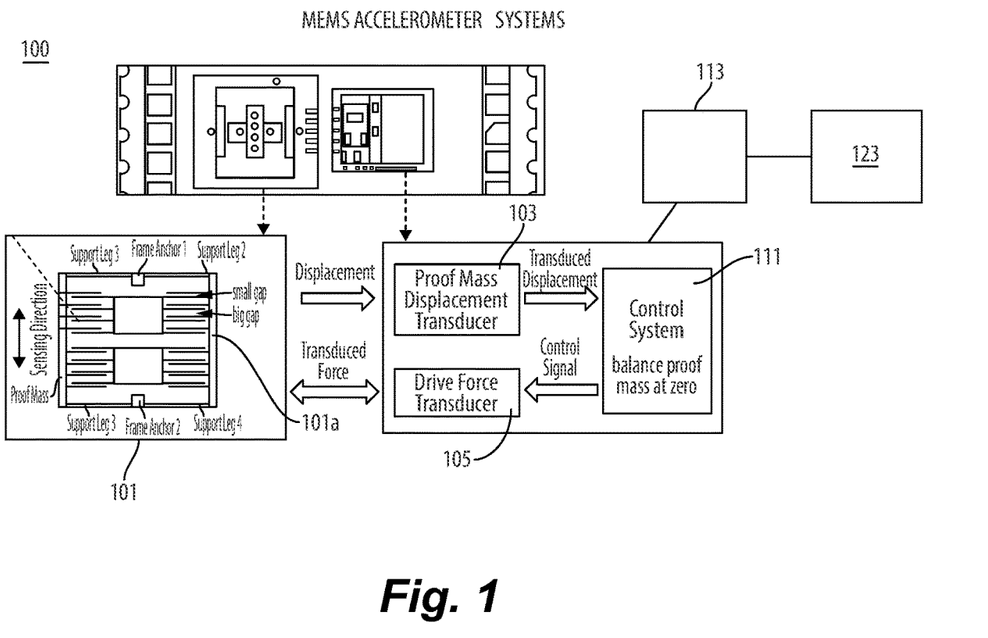
FIG. 1 is a schematic diagram of an embodiment of MEMS accelerometer system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-12.

Referring to FIGS. 1-6, a MEMS accelerometer system 100 can include a proof mass device 101 having a proof mass 101a configured to move from an initial position in response to an input acceleration. The proof mass device 101 can be an interdigitated capacitance arrangement (e.g., having metallic interdigitated members, a portion of which are connected to the proof mass 101a to move relative to another portion of digits).

The system 100 can include a transducer 103 (e.g., a pick-off transducer) operatively connected to the proof mass device 101 to output a transducer signal correlating to a movement and/or position of the proof mass 101a. The transducer signal can be an indication of capacitance, and thus, can be correlated to position of the proof mass, for example.

The system 100 can include a driver 105 (e.g., a drive force transducer) operatively connected to the proof mass device 101 and configured to drive the proof mass 101a. The driver 105 can be configured to electro mechanically drive the proof mass 101a back toward the initial positon, for example.

The system 100 can include a controller 111 operatively connected to the driver 105 to control the driver 105. The controller 111 can be operatively connected to the transducer 103 to receive the transducer signal and output a drive signal to the driver 105 to drive the proof mass 101a toward an initial position.

The system 100 can include an observer module 113 operatively connected to the controller 111 to receive the drive signal. The observer module 113 can be operatively connected to the transducer 103 to receive the transducer signal. The observer module 113 can be configured to deterministically estimate the input acceleration based on the transducer signal and the drive signal based on a deterministic model. The observer module 113 can be configured to output an estimated input acceleration signal.

Figure 4:
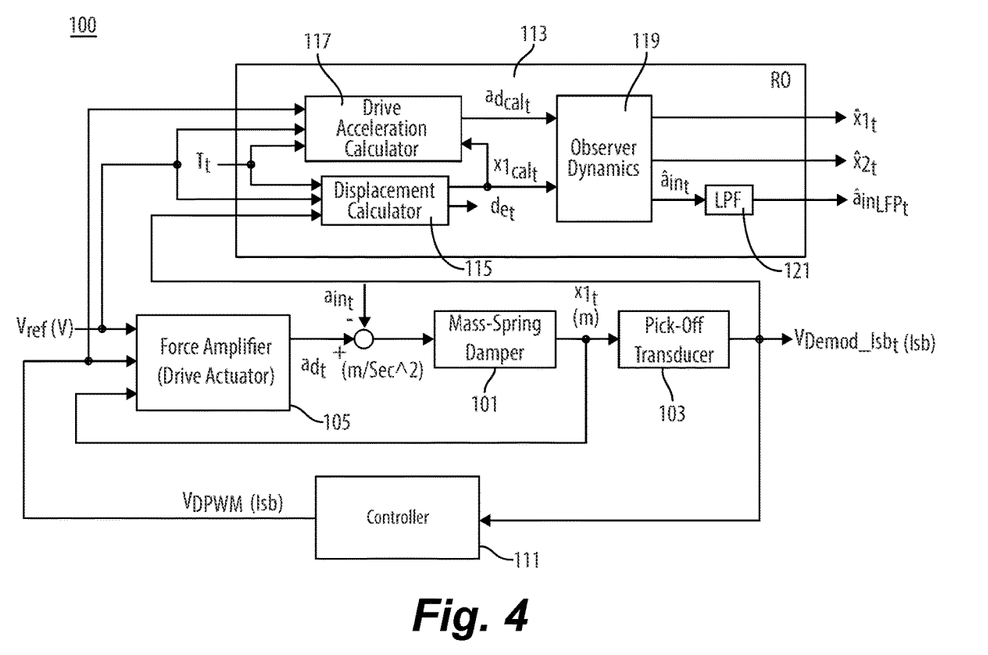
FIG. 4 is a schematic diagram of the system of FIG. 1 with a Robust Observer module addition.
Figure 5:
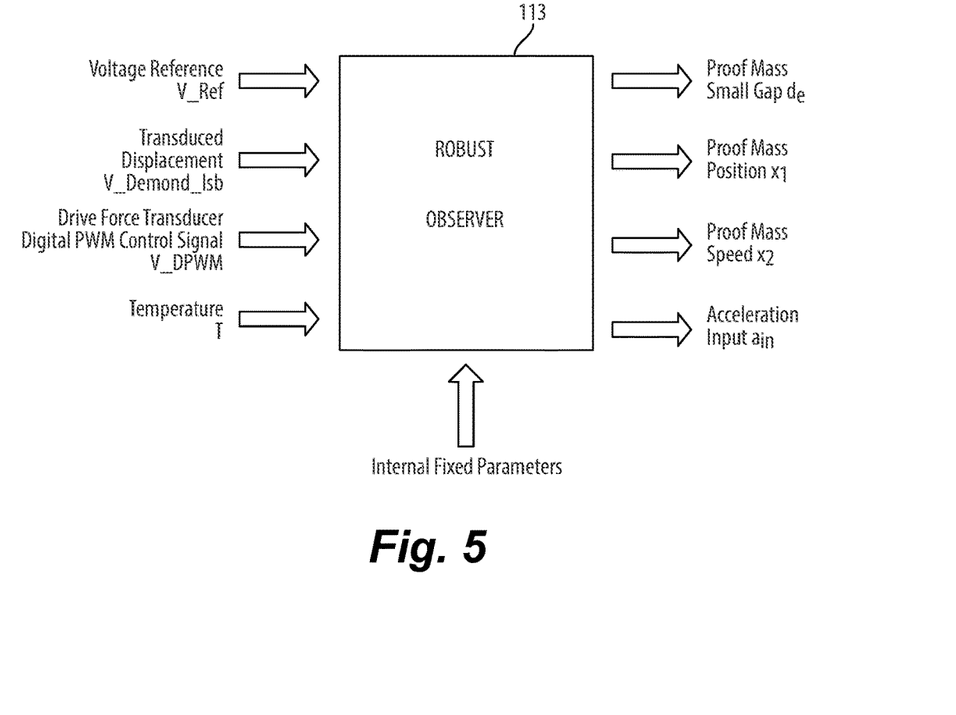
FIG. 5 is a schematic functional diagram of the embodiment of the robust observer module of the system of FIG. 4.
Figure 6:
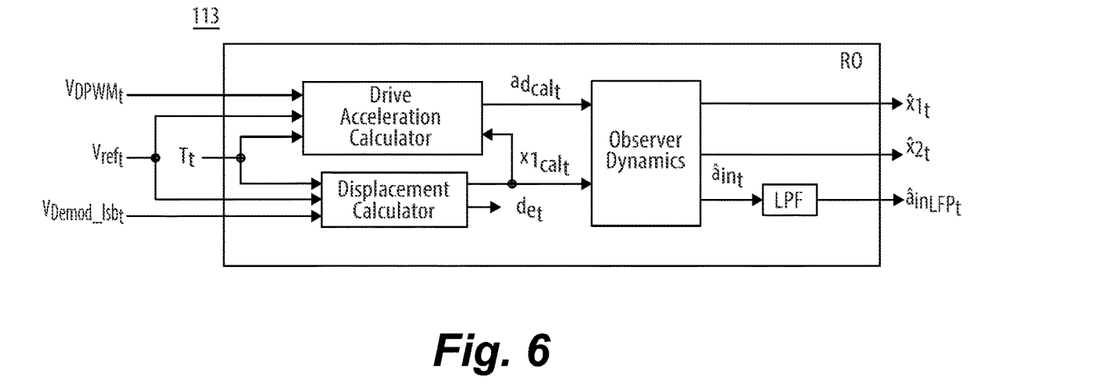
FIG. 6 is a schematic diagram of the embodiment of FIG. 5.

The observer module 113 may not be connected to the input of the controller 111 such that the estimated input acceleration signal is not used to control the driver 105 or the position of the proof mass 105a. The observer module 113 can be configured to receive a temperature signal (e.g., signal $T_t$ as shown, e.g., an electronics board temperature reading) from a temperature sensor (not shown). In certain embodiments, the observer module 113 can be configured to estimate the input acceleration further based on the temperature reading.

In certain embodiments, the observer module 113 can include a displacement calculator module 115, a drive acceleration calculator module 117, and an observer dynamics module 119. The displacement calculator module 115 can be configured to receive the transducer signal and the temperature signal, and to output a calculated displacement signal. As shown, the displacement calculator module 115 can receive $V_{Demod\_lsb}$ (e.g., the transducer signal), the reference voltage (Vref, e.g., a fixed parameter), and the temperature signal ($T_t$, e.g., a direct reading of temperature of the board). The displacement calculator module 115 can then calculate and output a calculated displacement of the proof mass ($x_{lcal\_t}$). This module 115 can also output a small gap calculation ($d_{e\_t}$, e.g., which can be a function of temperature induced deformation) as a byproduct which can be used for other calibration purposes, health monitoring, or any other suitable purpose.

The drive acceleration calculator module 117 can be configured to receive the driver signal, the temperature signal, the calculated displacement signal, and a reference signal, and to output a calculated restorative acceleration signal that estimates the restorative acceleration required to drive the proof mass 101*a* to the initial position. The drive acceleration calculator module 117 can receive the controller signal ($V_{DPWM\_1}$), Vref, $T_t$, and $x_{1cal\_1}$ (e.g., from displacement calculator). This module 117 can then calculate the calculated acceleration $a_{d\_cal\_t}$ to restore the mass back to zero (e.g., restorative acceleration) and output it to the observer dynamics module 113. The displacement calculator module 117 can use a mathematical model (based on the MEMS device structure) to convert input voltages to a distance reading.

The observer dynamics module 119 can be operatively connected to the drive acceleration calculator module 117 and the displacement calculator module 115. The observer dynamics module 119 can be configured to calculate the estimated input acceleration based on the calculated restorative acceleration signal and calculated displacement signal. The observer dynamics module 119 can use $a_{d\_cal\_t}$ and $x_{1cal\_1}$ and can calculate estimated acceleration in ($a_{in\_t}$). In certain embodiments, the observer dynamics module 119 can also output $x_{1t}$ and $x_{2t}$ which are other physical parameters such as vibrational speed of the proof mass and position of the proof mass.

The observer module 113 can include a low pass filter 121 operatively connected to the observer dynamics module 119 to receive the estimated input acceleration signal to filter noise from the estimated input acceleration signal and to output a filtered estimated input acceleration signal. The observer module 113 can be configured to generate an estimate of the proof-mass displacement $\hat{x}_{1_t}$, the proof-mass speed $\hat{x}_{2_t}$ and the input acceleration $\hat{a}_{in_t}$, in accordance with the below relationships:

$$\begin{bmatrix} \dot{\hat{x}}_{1_t} \\ \dot{\hat{x}}_{2_t} \\ \dot{\hat{x}}_{3_t} \end{bmatrix} = \begin{bmatrix} -K_1 & a_{12} & 0 \\ a_{21}-K_2 & a_{22}+L & L \\ -a_{21} & -a_{22}-L & -L \end{bmatrix} \begin{bmatrix} \hat{x}_{1_t} \\ \hat{x}_{2_t} \\ \hat{x}_{3_t} \end{bmatrix} + \begin{bmatrix} 0 & K_1 \\ 1 & K_2 \\ -1 & 0 \end{bmatrix} \begin{bmatrix} a_{d_{cal_t}} \\ x_{1_{cal_t}} \end{bmatrix}$$

$$\hat{a}_{in_t} = -L\hat{x}_{2_t} - L\hat{x}_{3_t}$$

wherein t denotes time, and $K_1$, $K_2$ and L are observer gains, $\hat{x}_{3_t}$ is an artificial observer state, and wherein $a_{12}$, $a_{21}$, $a_{22}$ are constant parameters in a proof-mass second order linear dynamical model from the total applied acceleration to proof-mass displacement as shown in the relationship below:

$$\begin{bmatrix} \dot{x}_{1_t} \\ \dot{x}_{2_t} \end{bmatrix} = \begin{bmatrix} 0 & a_{12} \\ a_{21} & a_{22} \end{bmatrix} \begin{bmatrix} x_{1_t} \\ x_{2_t} \end{bmatrix} + \begin{bmatrix} 0 \\ 1 \end{bmatrix} a_{d_t} - \begin{bmatrix} 0 \\ 1 \end{bmatrix} a_{in_t} + \begin{bmatrix} 0 \\ 1 \end{bmatrix} w_x.$$

$$y = x_{1_t} + w_y$$

where $w_x$ and $w_y$ denote unknown in general disturbances and/or uncertainties (e.g. measurement noise).

In certain embodiments, the system 100 can include a device or system 123 operatively connected to the low pass filter 121 to receive the filtered input acceleration signal and either use, record, transmit, or display the data as required. Any suitable module or other component disclosed herein, e.g., as described above, can be embodied as and/or include any suitable computational hardware and/or software. Any signal disclosed herein can be an analog (e.g., a voltage signals as shown) or digital signal, or any combination thereof.

In accordance with at least one aspect of this disclosure, an avionics system can include a MEMS accelerometer system. The MEMS accelerometer system can be any suitable accelerometer system disclosed herein, e.g., system 100 as described above.

In certain sensor systems such as MEMS, a system may need to drive a proof mass back into an original position or the device may no longer function because the proof mass will hit a stop. In certain systems, the controller calculates where the mass is, then calculates energy needed to push mass back electromechanically to its zero/initial position. The controller output can be a better read of acceleration as the transducer output can include noise, etc. There are both transients, then there is bias in the steady state in traditional system Embodiments can include a robust observer design for MEMS accelerometers. Embodiments relate to the design implementation of a novel observer system to improve the performance of Micro-Electrical-Mechanical-Systems (MEMS) accelerometers. The proposed observer can operate as a stand-alone system on new devices or included as complementary feature in legacy MEMS accelerometer products. The proposed observer can be implemented either in hardware via analogue electronics or as an embedded software-controlled device. The proposed observer under appropriate setup and tuning of its parameters can improve the operation of MEMS accelerometer devices toward tactical grade and beyond. The proposed observer system architecture and design can be described and implemented in closed analytical form with deterministic mathematical equations.

The general architecture of a single axis very high precision (VHP) MEMS-A accelerometer capacitance device is shown in.

For the system of
external applied input acceleration displaces the Proof-Mass and varies the distant of the formed capacitors plates and hence the overall capacitance. The above capacitance variation is transduced to an electrical voltage by a displacement transducer (Pick-Off) which is then used by a control system in order to excite the Drive Force Transducer to apply an appropriate electrical Force (i.e., and acceleration) and balance the Proof-Mass into a desired zero position.

Figure 2:
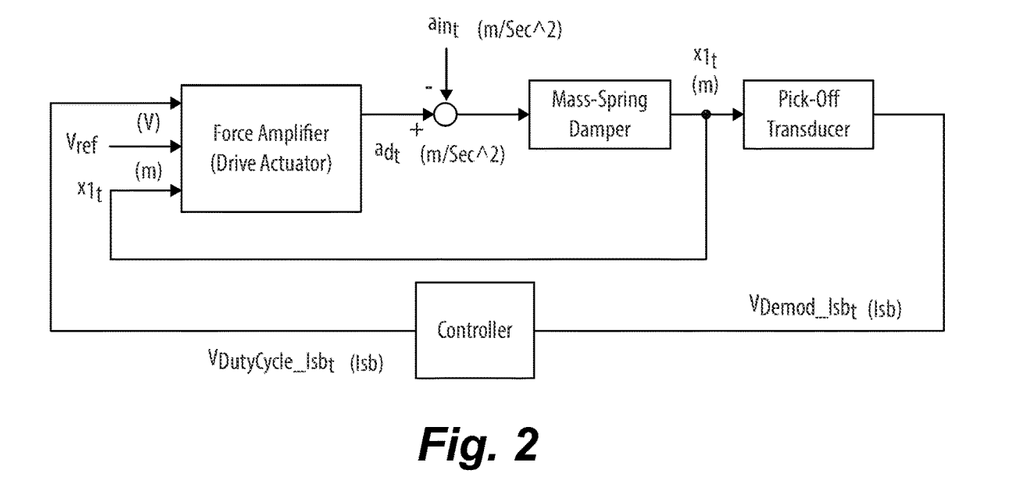
FIG. 2 is a schematic diagram of a portion of the accelerometer controller system of FIG. 1 (e.g., the portion show can be the entirety of a traditional system)
Figure 3:
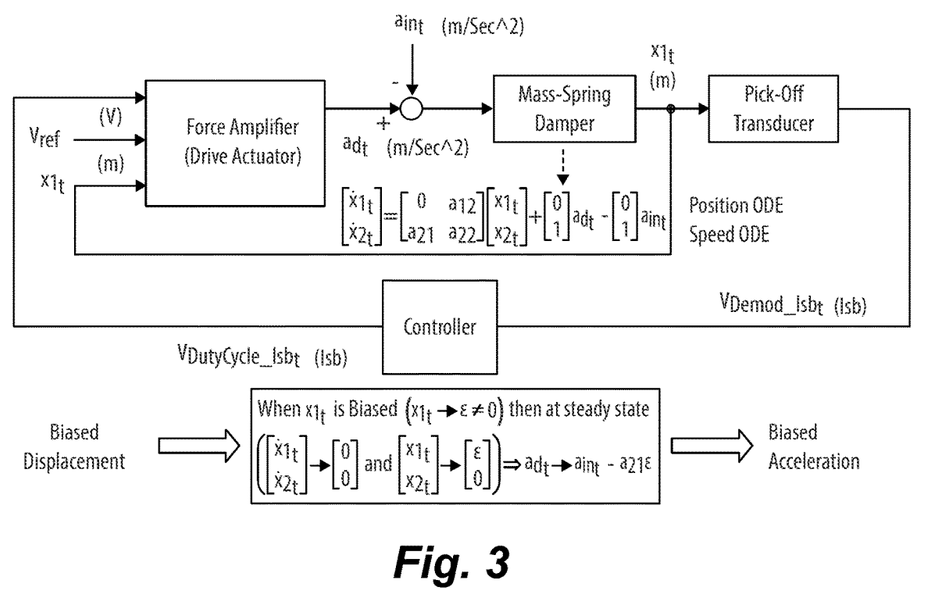
FIG. 3 is a schematic diagram of the accelerometer controller system of FIG. 2, showing an example of a biased displacement results in biased acceleration estimates.

In the portion of the system as shown in FIG. 2, the input acceleration signal that is to be sensed can be estimated by the controller's output when the system rests in steady state. The controller can be designed to operate on the displacement of the Proof-Mass (Mass-Spring Damper System), as sensed by the Pick-Off Transducer, and generate a drive command signal to the Force Amplifier that will restore and maintain the Proof-Mass at its centered (zero displacement) location. When the Proof-Mass is stabilized in the zero steady state position, the acceleration acting on the Proof-Mass due to the Force Amplifier exactly balances the specific acceleration acting on the system and is therefore a good estimate of the input acceleration. However, it should be noted that when the Proof-Mass is not stabilized in the zero steady state position, the controller's output is not a good estimate of the input acceleration, and an error in the estimate of the acceleration is created as illustrated in FIG. 3, which shows the bias acceleration problem. In addition, in cases/applications where significant temperature variations are developed, the MEMS formed capacitor plates material can deform, and, hence the overall capacitance can change which results in an additional temperature attributed bias errors in the estimated acceleration. The traditional MEMS controllers are agnostic to such temperature effects and incapable of resolving temperature related bias acceleration estimation errors.

Thus, this type of control scheme as shown in FIG. 3 can be referred to as the legacy system, and such a controller is not an optimal observer of the input acceleration. In fact, the input acceleration to observer enters the system as a disturbance, and so the actual goal of the accelerometer device is to observer the disturbance of the system. Traditional controller solutions only satisfies the observation goal when in steady state, and in fact the controller loop gain designs must conform to the usual trade-offs between performance response of the Proof-Mass and disturbance rejection. Embodiments, however, utilize a robust observer (RO) to the system which is specifically designed to observer the input acceleration disturbance independent of the closed loop Proof Mass feedback control loop. In this configuration, gains of the RO can be designed independently from gains of the Controller and high gains in the observer will not destabilize the closed loop Proof-Mass system. This allows the RO to more accurately track and provide estimates of the input acceleration acting on the system, reducing the estimation bias during transient motion of the proof mass and on steady state, and improved rejection of system noise. An overall block diagram off the MEMS-Accelerometer with the RO is shown in FIG. 4.

The robust observer (RO) can be an additive passive dynamic component to the MEMS-accelerometer circuit in the sense that it doesn't actuate or interfere with the closed loop control system. In certain embodiments, it receives as inputs 1) the Demod lsb from the pick-off transducer, 2) the unfiltered Digital PWM signal from the loop-filter (controller), 3) the voltage reference of transducers and 4) the temperature signal from a MEMS-A available temperature sensor. It can output estimates of: the Proof-Mass small gap, 2) Proof-Mass displacement, 3) Proof-Mass speed and 4) the external input acceleration. An input/output block diagram representation of the RO component is shown in FIG. 5.

The Robust Observer addition to the MEMS Accelerometer can include four components as shown in FIG. 6 and described below.

Displacement Calculator Module

In certain embodiments, this component can be driven by the Demod lsb, the Reference Voltage and Temperature and calculates the Proof-Mass small gap and displacement as follows. In certain embodiments, using a pre calibrated acceleration bias model as function of temperature, it calculates online the proof-mass small gap $d_e(T)$ as function of temperature T. In certain embodiments, in order to make the code implementation simpler and reduce the online real-time computational burden, $d_e(T)$ can be pre calculated off-line from the calibrated acceleration bias temperature model. In certain embodiments, using $d_e(T)$ above, the nonlinear model of the Pick-Off transducer, and the Demodulator and ADC gains, the Proof-Mass displacement is calculated as $x_{1_{calt}}$.

Drive Acceleration Calculator Module

In certain embodiments, this component is driven by the Digital PWM from the MEMS-A closed loop controller (Loop-Filter), the Reference Voltage and the calculated Proof-Mass displacement evaluated by the Displacement Calculator (see A) above). In certain embodiments, it calculates the drive acceleration generated from the nonlinear model of the Drive Force Transducer.

Observer Dynamics Module

In certain embodiments, this component implements the dynamic observer which is driven by the calculated Proof-Mass displacement and drive acceleration and generates estimates of the Proof-Mass displacement $\hat{x}_{1_t}$, the Proof-Mass speed $\hat{x}_{2_t}$ and the external input acceleration $\hat{a}_{in_t}$, as shown below.

$$\begin{bmatrix} \dot{\hat{x}}_{1_t} \\ \dot{\hat{x}}_{2_t} \\ \dot{\hat{x}}_{3_t} \end{bmatrix} = \begin{bmatrix} -K_1 & a_{12} & 0 \\ a_{21} - K_2 & a_{22} + L & L \\ -a_{21} & -a_{22} - L & -L \end{bmatrix} \begin{bmatrix} \hat{x}_{1_t} \\ \hat{x}_{2_t} \\ \hat{x}_{3_t} \end{bmatrix} + \begin{bmatrix} 0 & K_1 \\ 1 & K_2 \\ -1 & 0 \end{bmatrix} \begin{bmatrix} a_{d_{cal_t}} \\ x_{1_{cal_t}} \end{bmatrix}$$

$$\hat{a}_{in_t} = -L\hat{x}_{2_t} - L\hat{x}_{3_t}$$

$K_1$, $K_2$ and L are the observer gains, designed by a suitable method. $a_{12}$, $a_{21}$, $a_{22}$ are constant parameters in the Proof-Mass second order linear dynamical model from the total applied acceleration to Proof-Mass displacement as shown below:

$$\begin{bmatrix} \dot{x}_{1_t} \\ \dot{x}_{2_t} \end{bmatrix} = \begin{bmatrix} 0 & a_{12} \\ a_{21} & a_{22} \end{bmatrix} \begin{bmatrix} x_{1_t} \\ x_{2_t} \end{bmatrix} + \begin{bmatrix} 0 \\ 1 \end{bmatrix} a_{d_t} - \begin{bmatrix} 0 \\ 1 \end{bmatrix} a_{in_t} + \begin{bmatrix} 0 \\ 1 \end{bmatrix} w_x$$

$$y = x_{1_t} + w_y.$$

$w_x$ and $w_y$ denote unknown in general disturbances and/or uncertainties (e.g. measurement noise).

Low Pass Filter (LPF)

In certain embodiments, this component is an appropriate low-pass filter used to filter out undesired high order harmonic content and noise from observer input acceleration estimate $\hat{a}_{in_t}$. An example setup for the LPF is a 4th-order Butterworth low-pass filter.

Robust Observer Design

The design of the observer can include of determining gains $K_1$, $K_2$, L and setting the LPF gains in continuous time domain. When the design is implemented in real-time (online) code, the equations of the observer and LPF are transformed into the sampled data respective ones accordingly under a pre-fixed sampling time period.

Design of $K_1$, $K_2$

In certain embodiments, $K_1$, $K_2$ are determined offline and such that they minimize the impact of measurement noise (say $w_y$), additive state uncertainties/disturbances (say $w_x$) and initial estimation uncertainty $x_0 - \hat{x}_0$ (where $\hat{x}_t = [\hat{x}_{1_t}, \hat{x}_{2_t}, \hat{x}_{3_t}]^T$) to the estimation of displacement $\hat{x}_{1_t}$, speed $\hat{x}_{2_t}$ and internal sate $\hat{x}_{3_t}$. In certain embodiments, this is effectively achieved by minimizing the energy gain of the transfer function from measurement noise, additive state uncertainties, disturbances and initial estimation uncertainty to the estimation error, as this is formulated with the design metric in FIG. 7.

Figure 7:
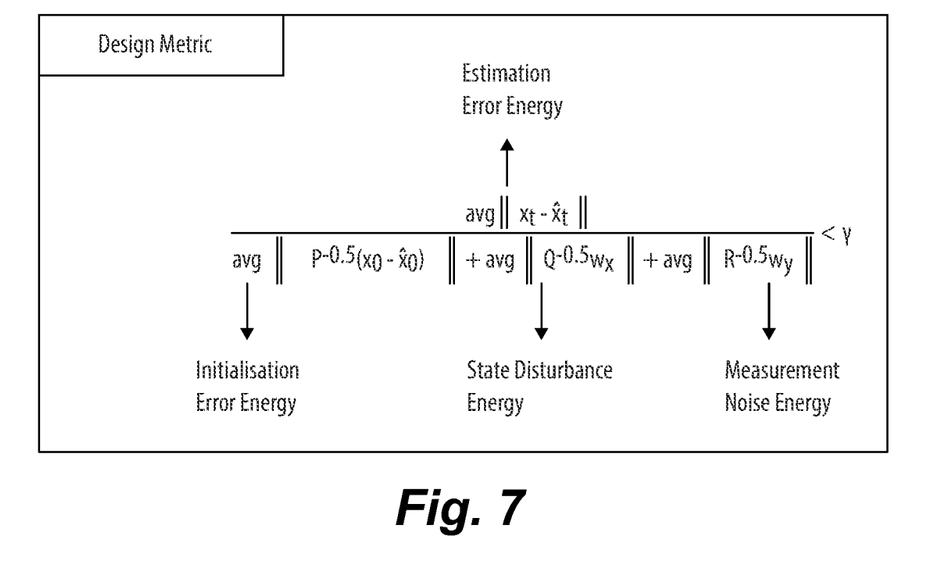
FIG. 7 is a schematic diagram of an embodiment of a design metric for certain observer gains in accordance with this disclosure.

In the design metric in FIG. 7, Q and R are user design parameters representing penalty weights to the additive state uncertainties/disturbances and measurement noise respectively. Q is a 2×2 positive semi-definite matrix and R is a positive scalar. In certain embodiments, the usual setup is to select $$Q = \begin{bmatrix} 0 & 0 \\ 0 & q_2 \end{bmatrix}$$

with $q_2 > 0$ substantially large, and R substantially small. Based on Q and R, P is determined from the positive semi-definite solution of the matrix Algebraic Riccati Equation (ARE)

$$AP + PA^T - PMP + Q = 0,$$

where, $$A = \begin{bmatrix} 0 & a_{12} \\ a_{21} & a_{22} \end{bmatrix}$$

with $a_{12}$, $a_{21}$, $a_{22}$ from the Proof-Mass dynamical model (see Observer Dynamics Module), $$M = \begin{bmatrix} R^{-1} - \gamma^{-1} & 0 \\ 0 & \gamma^{-1} \end{bmatrix}$$

and usually $\gamma = 1$. After computing $$P = \begin{bmatrix} p_{11} & p_{12} \\ p_{12} & p_{22} \end{bmatrix}$$

as above, the gains $K_1$, $K_2$ are derived as follows.

$$K_1 = R^{-1} p_{11}$$

$$K_2 = R^{-1} p_{12}$$

The above design variables are related to the linear second order dynamical model of the Proof-Mass.

Design of L

In certain embodiments, L is tuned by the user at substantially high positive value. L trade-offs between bandwidth (speed of response) and amplification of high frequency harmonics (undesired harmonic redundant oscillations and/or noise). High L values resulting a high-gain observer with high bandwidth (fast dynamic response) to the expense of high frequency harmonic content in the observer outputs, and vice versa.

Design of the LPF

The usual setup for the LPF are 4th-order Butterworth low-pass filters. The design can be implemented as two second order low-pass lifters in series. In certain embodiments, the design parameter in continuous time domain is the filter cut-off frequency. The above continuous design can be implemented in code directly as an equivalent sampled data (digital) state space of the following z-transfer functions.

$$y_f(z) = \frac{F_{n10} + F_{n11} z^{-1} + F_{n12} z^{-2}}{1 + F_{d11} z^{-1} + F_{d12} z^{-2}} x_a(z)$$

$$x_{a_f}(z) = \frac{F_{n20} + F_{n21} z^{-1} + F_{n22} z^{-2}}{1 + F_{d21} z^{-1} + F_{d22} z^{-2}} y_f(z)$$

In certain embodiments, the user can design the above filter offline and then set the values of the above filter coefficients in the online code.

Simulation Performance Results

FIGS. 8-12 show the simulated performance of the Robust Observer (RO) compared to the performance of a Legacy design MEMs accelerometer. In these figures the data has been normalized to show relative improvements of the RO with respect to a legacy design while avoiding any revelations of technical data either actual or predicted.

Figure 8:
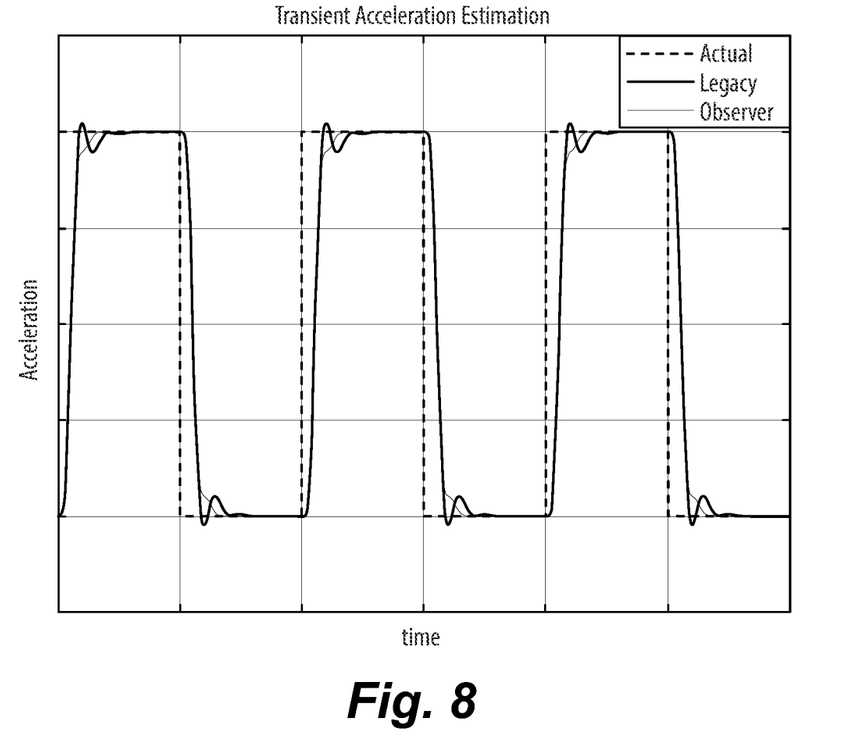
FIG. 8 shows a comparison for transient acceleration response.
Figure 9A:
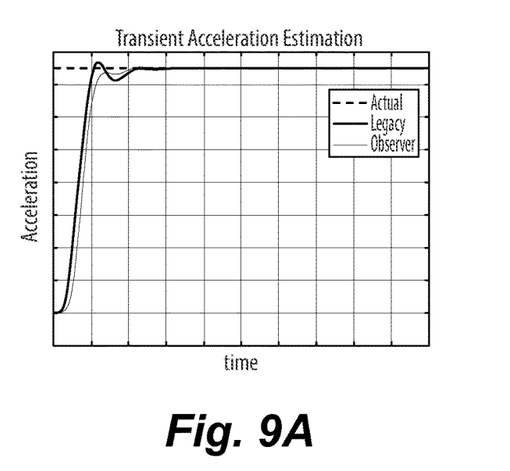
FIGS. 9A, 9B, 9C, and 9D show four charts of comparison for acceleration estimation response assuming no bias and no noise.
Figure 9B:
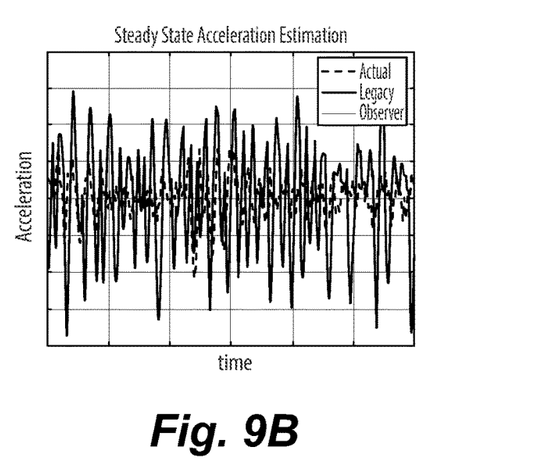
Figure 9C:
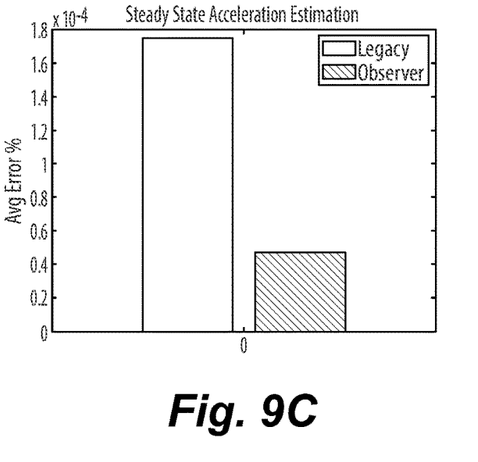
Figure 9D:
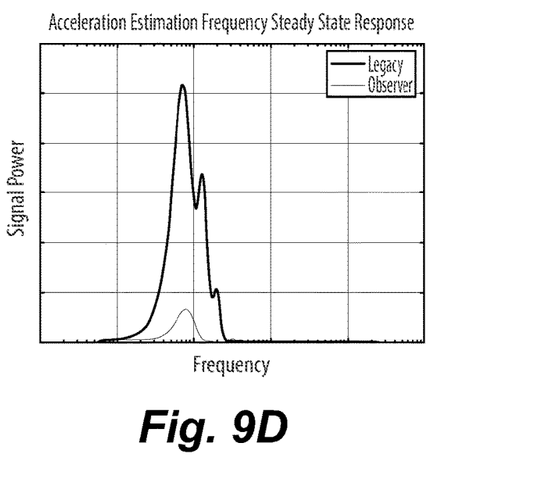
Figure 10A:
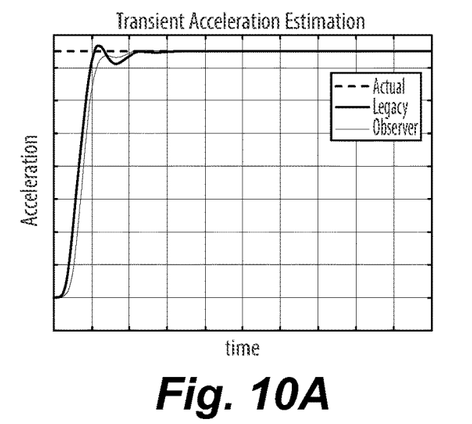
FIGS. 10A, 10B, 10C, 10D, 10E, and 10F show six charts of comparison for acceleration estimation response assuming bias due to thermal variation and nonlinear electronic random noise.
Figure 10B:
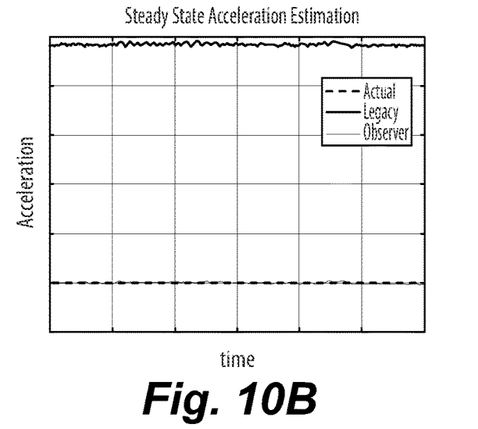
Figure 10C:
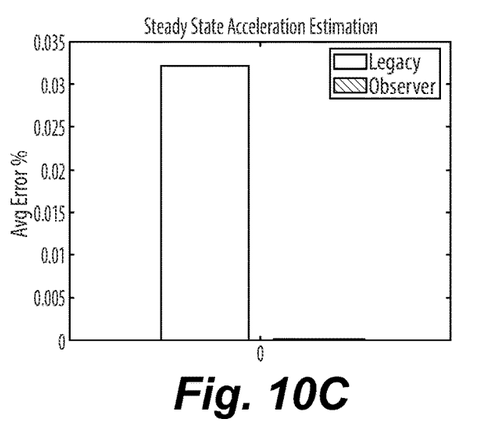
Figure 10D:
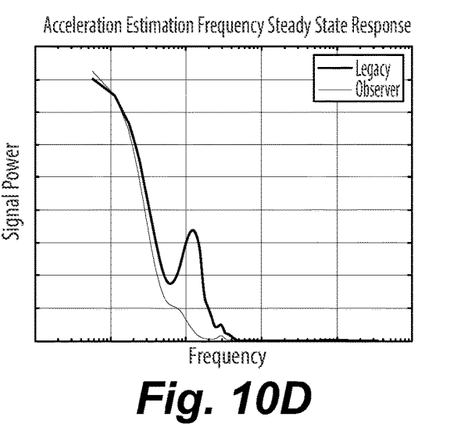
Figure 10E:
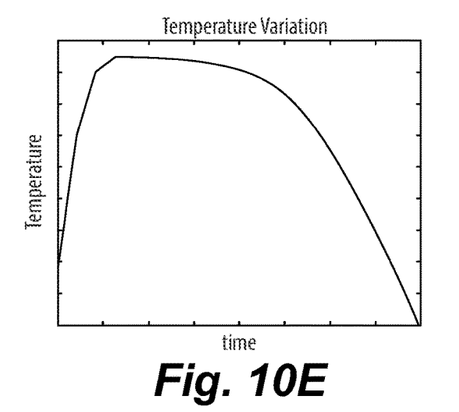
Figure 10F:
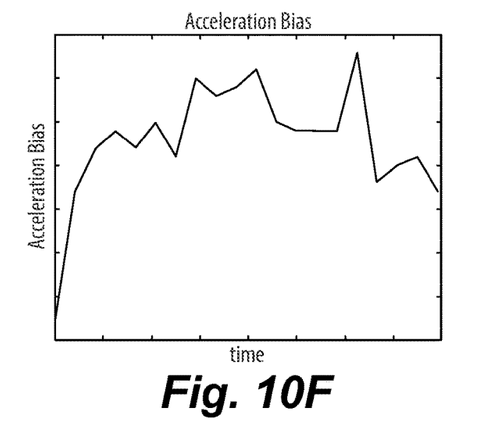
Figure 11A:
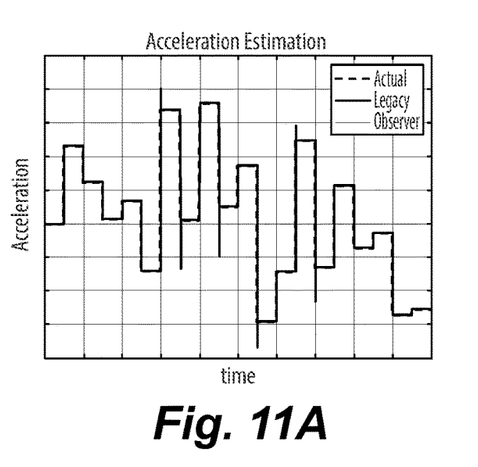
FIGS. 11A, 11B, 11C, and 11D show four charts of comparison for acceleration estimation response at multiple system operational envelops and system thermal conditions.
Figure 11B:
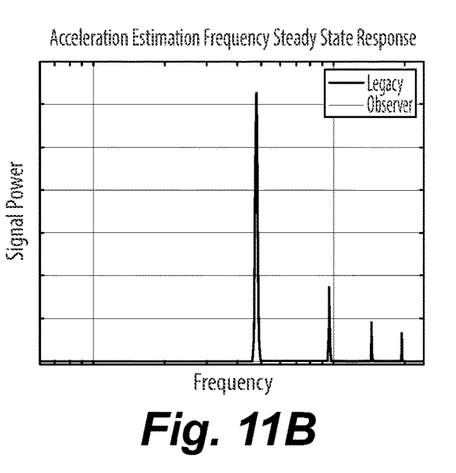
Figure 11C:
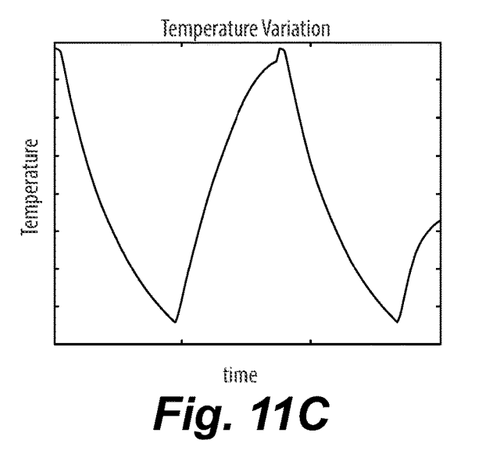
Figure 11D:
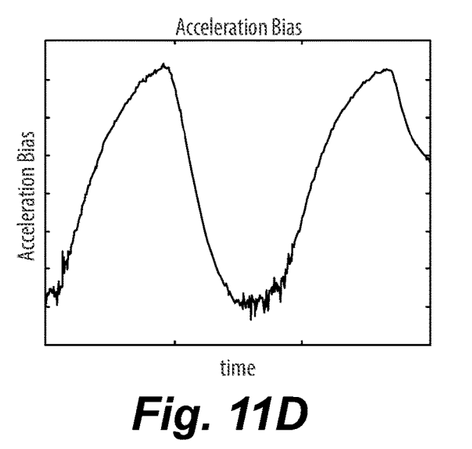
Figure 12A:
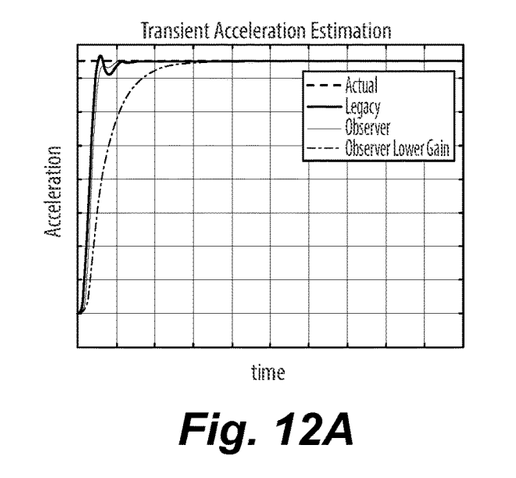
FIGS. 12A, 12B, 12C, and 12D show four charts of comparison, showing additionally observer gain L having a 70% reduction.
Figure 12B:
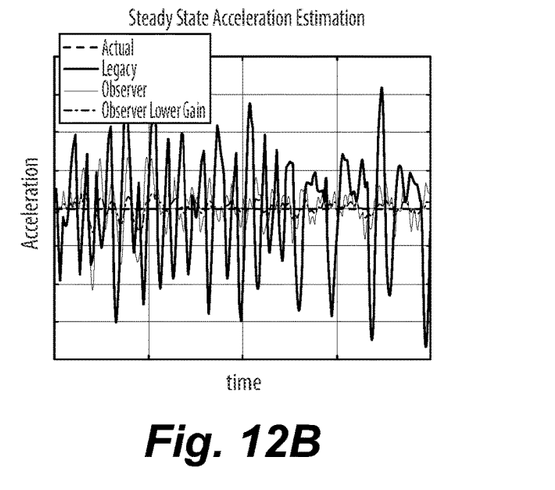
Figure 12C:
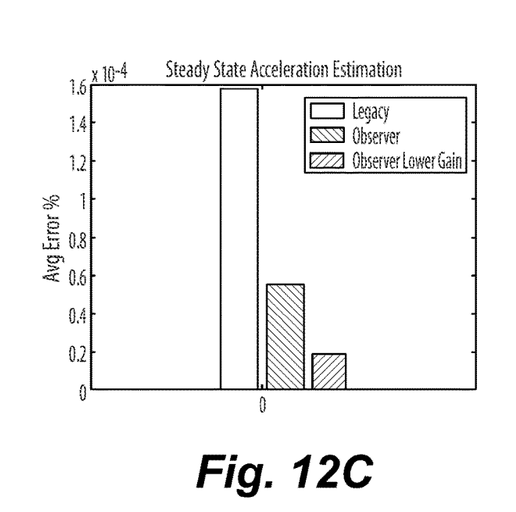
Figure 12D:
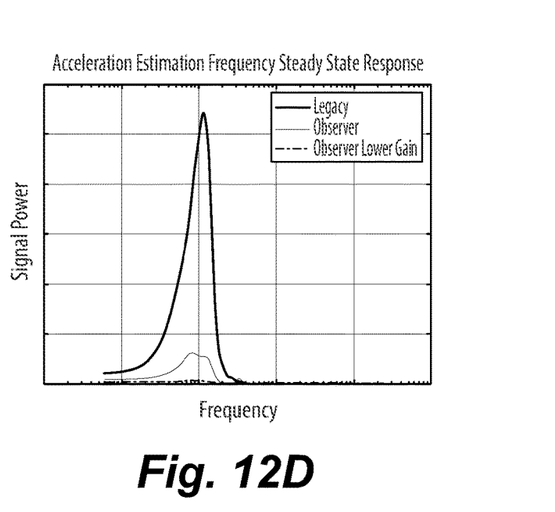

FIG. 8 shows the transient response of the accelerator estimates to a square wave acceleration input with no noise and no temperature bias. Both estimates are affected by the delays inherent in the reading of the pick-off transducer, but the RO estimate is more accurate with minimal overshoot and reaches steady state in about half the time of the Legacy design.

For the demonstrations shown below in FIGS. 9-12, the RO operates together with single PI feedback controller which replaces the Legacy filter controller in the MEMS accelerometer. This configuration was chosen for reducing the complexity of the Legacy controller and by no means pose a limitation, as generally the RO can operate along with any feedback controller. In addition, the RO was re-tuned to provide increased noise rejection with some minimal reduction in response time. A major advantage of this architecture is that the Robust Observer can be tuned independently to achieve desired output performance bandwidth vs disturbance rejection without affecting the stability margins of the closed loop proof mass controller.

FIGS. 9A, 9B, 9C, and 9D show a comparison of RO to Legacy for acceleration estimation response. The RO operates together with simple PI controller which replaces the Legacy. FIGS. 9A, 9B, 9C, and 9D show the transient and steady state responses of the acceleration estimates to a constant acceleration input with no electronic noise and no temperature bias. Both estimates are affected by the delays inherent in the reading of the pick-off transducer, but the RO estimate is more accurate with minimal overshoot. In addition, the average steady state error of RO is much smaller than that of the Legacy's. In steady state the RO clearly results in lower amplitude oscillations across the entire frequency spectrum. This RO capability is as well verified by the frequency response power spectrum, shown in FIGS. 9A, 9B, 9C, and 9D, where evidently the RO significantly mitigates steady state oscillations in steady state over legacy system.

FIGS. 10A, 10B, 10C, 10D, 10E, and 10F show a comparison of RO to Legacy for acceleration estimation response. The RO operates together with simple PI controller which replaces the Legacy. FIGS. 10A, 10B, 10C, 10D, 10E, and 10F show the transient and steady state responses of the accelerator estimates to a constant acceleration input as previously, but under the presence of acceleration bias due to temperature variations as shown in the last row of plots in FIGS. 10A, 10B, 10C, 10D, 10E, and 10F. In addition, the presence of nonlinear random hardware electronic noise in the op-amp output of the Pick-Off transducer is considered. This noise adds uncertainty at ±20% of the nominal OP-AMP output. As before, both estimates are affected by the delays inherent in the reading of the pick-off transducer. The transient response is similar to the no noise, no bias cases where the RO estimate is more accurate and with minimal overshoot in comparison to the Legacy design. Regarding the steady state oscillations, which in this case are affected as well by electronic noise, they are better mitigated by the RO as it is shown by the power spectrum graph. The noticeable improvement is the mitigation of acceleration bias as shown in the steady state time plot, where clearly the RO resulting minimum estimation error in contrast with the Legacy resulting a biased acceleration estimate. This is attributed to the RO feature of being gnostic of temperature bias models and therefore being able to model-based adapt to temperature variations over time.

FIGS. 11A, 11B, 11C, and 11D show a comparison of RO to Legacy for acceleration estimation response at multiple system operational envelops and system thermal conditions. The RO operates together with simple PI controller which replaces the Legacy. FIGS. 11A, 11B, 11C, and 11D show the response of the acceleration estimates to a series of multiple changing acceleration input levels, under the presence of electronic noise and delays inherent in the reading of the pick-off transducer. In addition, thermal variation and bias is present to the system as shown in the last row of graphs in FIGS. 11A, 11B, 11C, and 11D. The transient response in this case is like all previous cases where the RO estimate is more accurate and with minimal overshoot in comparison to the Legacy design. Regarding the steady state oscillations, which in this case are affected as well by electronic noise, they are better mitigated by the RO as it is shown by the power spectrum graph in steady state. The noticeable improvement in this test case is the deterioration of the Legacy system performance because of very large overshoots (spikes) occurring at several changes in the acceleration levels as shown in FIG. 11. The RO design however compensates for such oscillations and preserves its dynamical characteristics over variable operational envelopes and regimes. In addition, the RO results minimum estimation error in contrast with Legacy which results in a biased acceleration estimate as in previous cases.

FIGS. 12A, 12B, 12C, and 12D show observer gain L 70% reduction tuning to trade-off bandwidth (fast response) for robustness (steady state noise mitigation). The RO operates together with simple PI controller which replaces the Legacy. FIGS. 12A, 12B, 12C, and 12D show the response of the acceleration to a constant acceleration input, under the presence of electronic noise and delays inherent in the reading of the pick-off transducer. No thermal variation and bias are considered in this test as the intent here is to demonstrate design flexibility for trading steady-state accuracy vs dynamic speed response and thus capability of boosting the device's accuracy according to different specification grades. FIGS. 12A, 12B, 12C, and 12D, shown the Legacy, a nominal design of RO as in the previous presented cases and a retuned RO design, where the output single gain L is reduced by 70% from its nominal setup. From the plots in FIGS. 12A, 12B, 12C, and 12D it is apparent that steady state oscillations and noise can be further mitigated to result substantially smaller steady state errors, but to the expense of a slower but non-oscillatory transient system response. Obviously as it is illustrating herein, the proposed invention offers the capability of transforming the same MEMS device to different grade specifications, e.g., the same device can operate as very high performance (VHP) or as military tactical grade and vice-versa.

In summary, it is evident from the test cases presented above that the embodiments disclosed provide improvements in the estimation of specific acceleration acting upon the Proof-Mass device at least with improved dynamic (transient) system performance over legacy products with mitigated oscillations in steady state over legacy system, increased robustness to real time variations in system operational envelops and system thermal conditions, reduction of bias errors due to temperature variations, better attenuation of noise, and flexibility to tune the same device for operation at different MEMS accelerometer grades specifications.

Embodiments can include a mixed differential-algebraic deterministic architecture consisting of linear and nonlinear subsystems which are processing in real-time input signals from the MEMS accelerometer (MEMS-A) proof-mass position transduced voltage signal, the dynamic loop filter's (controller) output voltage signal and the MEMS-A temperature sensor signal, and consequently produces a measurement for the current acceleration of the device. Embodiments can be implemented in hardware electronics or as a system embedded software code and can designed to function in different fixed sampling rates. Embodiments can be robust to various MEMS-A operating (acceleration patterns and amplitudes) and environmental conditions (temperature variations). Embodiments can track external specific acceleration inputs to MEMS-A devices. Embodiments can minimize bias errors attributed to MEMS-A proof mass material geometric deformations due to thermal variations, and can help achieve VHP performance and accuracy. Embodiments can improve the dynamic (transient) MEMS-A system response. Embodiments can minimize system redundant oscillations at steady state performance Embodiments can minimize the impact of general (i.e., of any stochastic) signal noise. Embodiments can have tunable flexibility to set the same device at different MEMS accelerometer grades specifications. Embodiments can improve steady state response. In addition, embodiments can include an automated design and validation on simulators of the observer system design and its real time implementation, and a specific per MEMS-A device calibration process for tuning appropriately the mathematical models and algorithm of the observer.

Embodiments relate to the design implementation of a novel observer system to improve the performance Electrical-Mechanical-Systems (MEMS) accelerometers. There is a strong customer need to improve MEMS accelerometers to achieve tactical and eventually navigation grade performance.

Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a Field Programmable Gate Array (FPGA), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++, HDL, VHDL or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A MEMS accelerometer system, comprising:
   a proof mass device having a proof mass configured to move from an initial position in response to an input acceleration;
   a transducer operatively connected to the proof mass device to output a transducer signal correlating to a movement and/or position of the proof mass;
   a driver operatively connected to the proof mass device and configured to drive the proof mass;
   a controller operatively connected to the driver to control the driver, wherein the controller is operatively connected to the transducer to receive the transducer signal and output a drive signal to the driver to drive the proof mass toward an initial position;
   an observer module operatively connected to the controller to receive the drive signal, wherein the observer module is operatively connected to the transducer to receive the transducer signal, wherein the observer module is configured to deterministically estimate the input acceleration based on the transducer signal and the drive signal based on a deterministic model, wherein the observer module is configured to output an estimated input acceleration signal.

2. The system of claim 1, wherein the observer module is not connected to the input of the controller such that the estimated input acceleration signal is not used to control the driver or the position of the proof mass.

3. The system of claim 2, wherein the observer module is configured to receive a temperature signal from a temperature sensor, wherein the observer module is configured to estimate the input acceleration further based on the temperature reading.

4. The system of claim 3, wherein the observer module includes a displacement calculator module, a drive acceleration calculator module, and an observer dynamics module.

5. The system of claim 4, wherein the displacement calculator module is configured to receive the transducer signal and the temperature signal, and to output a calculated displacement signal.

6. The system of claim 5, wherein the drive acceleration calculator module is configured to receive the driver signal, the temperature signal, the calculated displacement signal, and a reference signal, and to output a calculated restorative acceleration signal that estimates the restorative acceleration required to drive the proof mass to the initial position.

7. The system of claim 6, wherein the observer dynamics module is operatively connected to the drive acceleration calculator module and the displacement calculator module, wherein the observer dynamics module is configured to calculate the estimated input acceleration based on the calculated restorative acceleration signal and calculated displacement signal.

8. The system of claim 7, wherein the observer module includes a low pass filter operatively connected to the observer dynamics module to receive the estimated input acceleration signal to filter noise from the estimated input acceleration signal and to output a filtered estimated input acceleration signal.

9. The system of claim 8, wherein the observer module is configured to generate an estimate of the proof-mass displacement $\hat{x}_{1_t}$, the proof-mass speed $\hat{x}_{2_t}$, and the input acceleration $\hat{a}_{in_t}$, in accordance with the below relationships:

$$\begin{bmatrix} \dot{\hat{x}}_{1_t} \\ \dot{\hat{x}}_{2_t} \\ \dot{\hat{x}}_{3_t} \end{bmatrix} = \begin{bmatrix} -K_1 & a_{12} & 0 \\ a_{21}-K_2 & a_{22}+L & L \\ -a_{21} & -a_{22}-L & -L \end{bmatrix} \begin{bmatrix} \hat{x}_{1_t} \\ \hat{x}_{2_t} \\ \hat{x}_{3_t} \end{bmatrix} + \begin{bmatrix} 0 & K_1 \\ 1 & K_2 \\ -1 & 0 \end{bmatrix} \begin{bmatrix} a_{d_{cal_t}} \\ x_{1_{cal_t}} \end{bmatrix}$$

$$\hat{a}_{in_t} = -L\hat{x}_{2_t} - L\hat{x}_{3_t}$$

wherein $K_1$, $K_2$ and L are observer gains, and wherein $a_{12}$, $a_{21}$, $a_{22}$ are constant parameters in a proof-mass second order linear dynamical model from the total applied acceleration to proof-mass displacement as shown in the relationship below:

$$\begin{bmatrix} \dot{x}_{1_t} \\ \dot{x}_{2_t} \end{bmatrix} = \begin{bmatrix} 0 & a_{12} \\ a_{21} & a_{22} \end{bmatrix} \begin{bmatrix} x_{1_t} \\ x_{2_t} \end{bmatrix} + \begin{bmatrix} 0 \\ 1 \end{bmatrix} a_{d_t} - \begin{bmatrix} 0 \\ 1 \end{bmatrix} a_{in_t} + \begin{bmatrix} 0 \\ 1 \end{bmatrix} w_x.$$

$$y = x_{1_t} + w_y$$

where $w_x$ and $w_y$ denote unknown in general disturbances and/or uncertainties (e.g. measurement noise).

10. The system of claim 9, further comprising a device or system operatively connected to the low pass filter to receive the filtered input acceleration signal and either use, record, transmit, or display the data as required.

* * * * *